United States Patent [19]

Splitt et al.

[11] 4,009,421

[45] Feb. 22, 1977

[54] STATION PROTECTOR WITH A THREE-ELECTRODE GAS TUBE ARRESTER

[75] Inventors: Frank G. Splitt, Arlington Heights; Eric A. Scheithauer, Chicago, both of Ill.

[73] Assignee: Cook Electric Company, Morton Grove, Ill.

[22] Filed: Dec. 1, 1975

[21] Appl. No.: 636,798

Related U.S. Application Data

[63] Continuation of Ser. No. 516,286, Oct. 21, 1974, abandoned.

[52] U.S. Cl. .................................. 361/119; 337/18; 361/120; 361/124

[51] Int. Cl.² .......................................... H02H 3/22

[58] Field of Search ..................... 317/61, 61.5, 66; 337/20, 28, 32, 33, 199, 213, 120, 17, 18, 34, 215, 216; 200/51.1, 51.11

[56] References Cited

UNITED STATES PATENTS

| | | | |
|---|---|---|---|
| 2,724,793 | 11/1955 | Fisher | 317/66 |
| 3,254,181 | 5/1966 | Lemieux | 337/18 |
| 3,310,712 | 3/1967 | Paddock | 317/120 |

*Primary Examiner*—Harry Moose
*Attorney, Agent, or Firm*—Mason, Kolehmainen, Rathburn & Wyss

[57] ABSTRACT

A station protector is used in protecting pairs of telephone lines at a station from high voltages or surge currents occurring on the telephone lines and includes a base assembly having an upstanding wall at one end, an arrester mounting section adjacent the opposite end, and a pair of line terminals and a ground terminal disposed between the wall and the arrester mounting section. A removable ground clip assembly is disposed in the arrester mounting section so that a three-electrode gas tube arrester having a line electrode at each end of the tube and a ground electrode therebetween can be mounted on the base assembly to provide protection for the telephone lines. The ground clip assembly contains movable contact assemblies insertable into each of a pair of cavities located in the arrester mounting section and resiliently biased so that a contact rod portion in the contact assembly is normally coupled to the ground terminal. When a case having the three-electrode gas tube retained therein is mounted on the ground clip assembly such that the ground electrode is coupled to the ground terminal, contact shafts fusibly linked to each of the line electrodes cause the contact rod portion of each of the contact assemblies to be disconnected from the ground terminal and to connect the contact shafts to the line terminals. In the preferred embodiment, a cover is slidable over the base assembly so as to protect the base assembly from the weather, insects and tampering.

26 Claims, 6 Drawing Figures

STATION PROTECTOR WITH A THREE-ELECTRODE GAS TUBE ARRESTER

The present application is a continuation application of patent application Ser. No. 516,286, filed on Oct. 21, 1974, and now abandoned.

The present invention relates to station protectors and, more specifically, to a new and improved station protector utilizing three-electrode gas tube arresters.

For each telephone set at a remote location, including all of the extensions for the same telephone number, a pair of telephone lines normally must be extended between the remote location, such as a house or the like, and a telephone central office. For at least the purposes of the present application, the term "station" will be used to refer to not only the telephone equipment including the telephone set and lines at the remote location, but also the environment, such as the house or the like, at which the equipment is located. In order to insure that the station, including the telephone equipment, other property and/or people using the equipment, is protected from high voltages or surge currents that might occur on the telephone lines due to lightning or the like, at least one overvoltage arrester is coupled to each such telephone line that is extended between the telephone central office and the station.

Various forms of overvoltage arresters can be coupled to the telephone lines to protect the telephone lines from such high voltages or surge currents. In many circumstances, a carbon type overvoltage arrester is utilized. One such type of carbon overvoltage arrester is disclosed in U.S. Pat. No. 3,703,665, which patent is assigned to the assignee of record of the present application. The overvoltage arrester disclosed in that patent has a spark gap formed between a line electrode coupled to the telephone line to be protected and a ground electrode coupled to ground. Whenever the spark gap is sparked over due to a high voltage surge on the telephone line, any surge current flowing on the protected line is coupled to ground potential instead of to the telephone equipment at the individual station which is being protected.

In addition to the carbon type overvoltage arresters, gas tube type arresters can be used in protecting the pair of telephone lines extended to the station. The gas tubes are usually of the two or three electrode type. Various ones of the two-electrode gas tube assemblies have a pair of opposed electrodes hermetically sealing opposite ends of an insulating spacer tube. Each of these electrodes have a portion extending into the spacer tube so that a spark gap is formed in the gas chamber formed within the spacer tube. In order to protect a line, one of the electrodes is connected to the telephone line to be protected and the other electrode is connected to ground potential. Whenever a high voltage of sufficient magnitude appears on the line connected to the one electrode, the spark gap within the insulating spacer tube breaks down. In this manner, the electrodes are coupled together and the higher voltage which is on the telephone line is coupled through the electrodes and spark gap to ground potential.

As is readily apparent in order to protect both telephone lines in a given pair, two separate two-electrode gas tube arresters are required. If desired, a single three-electrode gas tube arrester can be used to protect a given pair of telephone lines. A three-electrode gas tube arrester will normally have a pair of line electrodes that are connected at opposed ends of a central ground electrode by a pair of insulating spacer members. Each of the line electrodes of the three-electrode gas tube arrester is configured such that a spark gap is formed between each of the line electrodes and the central ground electrode. To protect the pair of telephone lines extended to a station, one of the lines is connected to one of the line electrodes and the other line is connected to the other line electrode. When a high voltage occurs on one of the pair of telephone lines, the spark gap between the line electrodes coupled to that line and the ground electrode sparks over such that the line is coupled to the ground potential and is thereby protected.

When a single pair of telephone lines are to be protected by the above discussed carbon type of overvoltage or two-electrode gas tube arresters, the overvoltage arresters can be mounted in a circuit or station such as the one disclosed in U.S. Pat. No. 3,310,712, which is also assigned to the assignee of record of the present application. The circuit protector disclosed in that patent is designed to mount a pair of overvoltage arresters of the carbon or two-electrode gas tube type in a housing which is protected from the weather, insects or tampering by unauthorized persons. When the pair of overvoltage arresters are mounted in such a circuit protector, one electrode of each of the overvoltage arresters is coupled to a line terminal to which is coupled one of the pair of telephone lines extended to the station. The other electrode of each of the overvoltage arresters is coupled to a grounded terminal. Thus, the telephone line is coupled to ground potential whenever the spark gap in the overvoltage arrester is shorted due to the occurrence of a high voltage surge.

The three-electrode gas tube type of overvoltage arresters are also normally mounted in a circuit protector when used at a station. Many of these circuit protectors have incorporated an external fail-safe mechanism to couple the pair of lines directly to ground potential whenever a prolonged overvoltage condition occurs on one or both of the telephone lines. Normally, this is accomplished by having a fusible link inserted between a shorting device and the central ground electrode of the arrester. In the event that a voltage of sufficient magnitude and length of time appears on either of the lines connected to the two line electrodes of the three-electrode gas tube arrester, the fusible link melts due to the heat generated by the conduction of current through the overvoltage arrester. When the fusible link does melt, the shorting device shorts each of the line electrodes, and thereby the pair of telephone lines, to ground potential and any subsequent overvoltage faults on the lines are coupled directly to ground potential by the shorting device.

Although some such available circuit protectors do have such fail-safe mechanisms to protect the telephone lines when prolonged overvoltage conditions occur on the telephone lines, these circuits protectors are designed only for use with three-electrode type of gas tube arresters so that the same protector cannot be used when a two-electrode gas tube or carbon type arrester is used to protect the telephone lines.

Accordingly, objects of the present invention are to provide a new and improved station protector that utilizes three-electrode gas tube arresters to protect pairs of telephone lines from high voltages or surge currents; that contains fail-safe mechanisms for use with three-electrode gas tube arresters; that normally maintains all lines and metal parts at ground potential whenever the gas tube arrester is not mounted in the protector; that enables the gas tube arrester to be firmly and properly positioned in the protector without the use of any special tools and without any personnel ever touching the gas tube arrester or any metal parts on the circuit protector; that has a tamperproof cover which is easily removed without special tools and affords protection for the protector from the weather or insects or other types of foreign particles which might cause noise on telephone lines; and that includes a ground clip assembly which an be removed from the circuit protector and which can be readily inserted into previously designed circuit protectors to convert those circuit protectors from a carbon type or two-electrode gas tube type circuit protector to a three-electrode gas tube protector containing fail-safe mechanisms.

In accordance with these and many other objects of the present invention, an embodiment of the present invention comprises a station protector used in protecting pairs of telephone lines at a given station from high voltages occurring on the telephone lines. The station protector includes a base assembly made of a high dielectric material having a base with an upstanding wall projecting from the base at one end and an arrester section positioned adjacent the other end of the base. A pair of line terminals and a ground terminal are located on the base between the upstanding wall and the arrester mounting section. The arrester mounting section has a pair of cavities at the base of each of which is a line contact coupled to one of the line terminals. Securably mountable in the arrester mounting section is a ground clip assembly which has movable contact assemblies insertable into each of the cavities and a ground arrester holder that is coupled to the ground terminal. Each of the movable contact assemblies has a rod portion normally biased to couple the line contact in each of the cavities to the ground arrester holder. Upon the positioning of an insulating case on the ground arrester holder, a ground electrode of a three-electrode gas tube arrester disposed in the case is positioned in a ground clip and line shafts fusibly linked to a pair of line electrodes of the arrester causes the contact rods to be disconnected from the ground terminal and coupled to the line terminals. In the preferred embodiment, the station protector has a notch in the upstanding walls in which is located an insulating grommet through which is extendable a pair of telephone lines to be protected. In addition, a tamperproof cover is slidably positioned over the base assembly to protect the base assembly from tampering as well as foreign particles which might cause interference on the telephone lines.

Many other objects and advantages of the present invention will become apparent from the following detailed description in conjunction with the following drawings.

Figure 1:
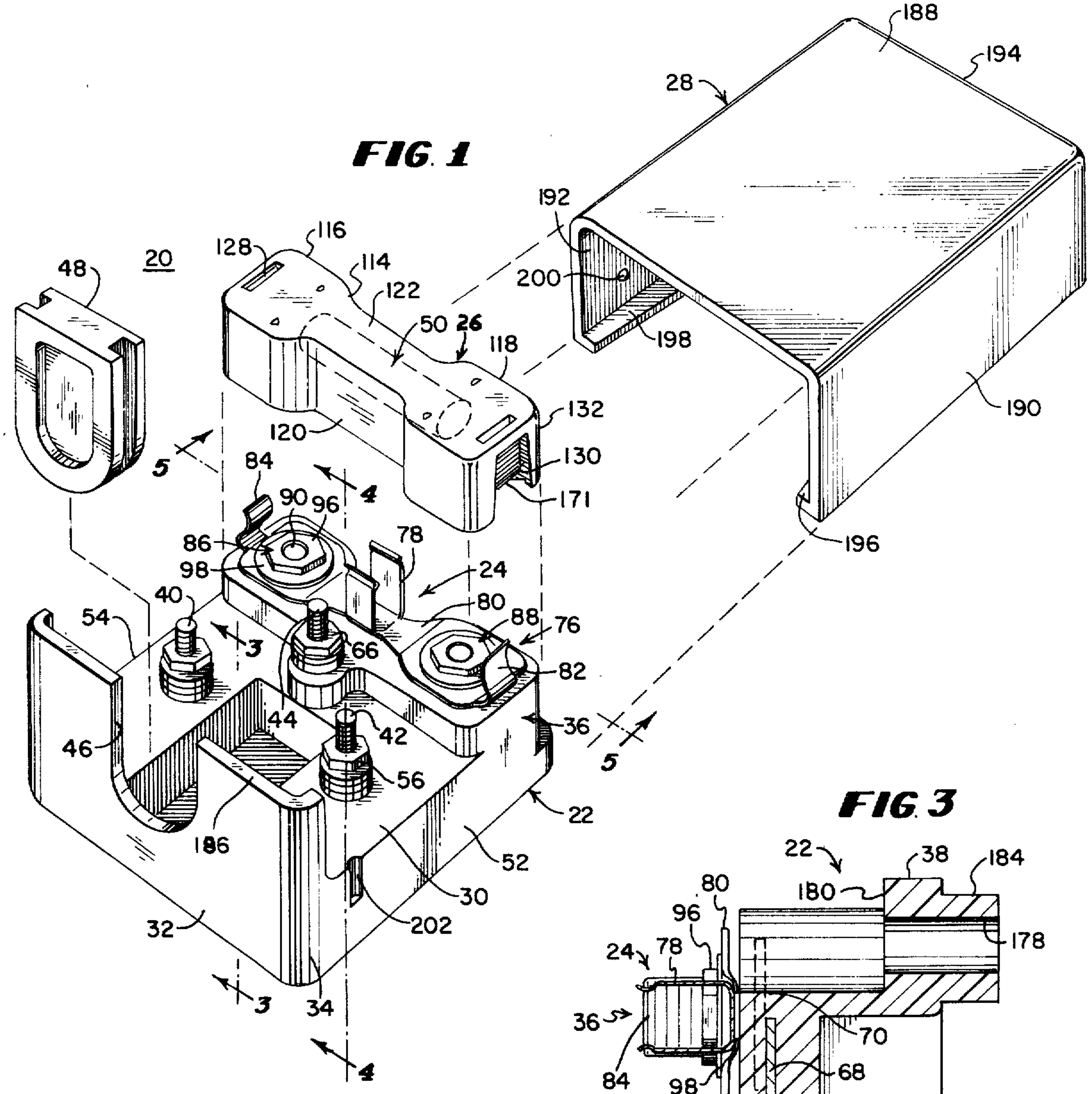
FIG. 1 is an exploded perspective view of the station protector embodying the present invention.

Referring now more specifically to FIG. 1 of the drawings, therein is disclosed a station protector which is generally designated by the numeral 20 and which embodies the present invention. The station protector 20 includes a base assembly 22, a ground clip assembly 24, an arrester module 26, and a cover 28. The base assembly 22 has a base portion 30 with an upstanding wall 32 at one end 34 and an arrester mounting section 36 adjacent another end 38 of the base 30. Located between the upstanding wall 32 and the arrester mounting section 36 are a pair of line terminals 40 and 42 and a ground terminal 44.

The upstanding wall 32 has a notch or aperture 46 in which is insertable an insulating grommet 48. Pairs of telephone lines (not shown) to be protected by the circuit protector 20 extend through the grommet 48 and are coupled to the terminals 40 and 42. A ground lead similarly is connected to the ground terminal 44 so that the ground terminal 44 is maintained at ground potential. The circuit protector 20 protects the telephone lines coupled to the terminals 40 and 42 by coupling the line terminals 40 and 42 to the ground terminal 44 through a three-electrode gas tube arrester 50 retained in the arrester module 26 whenever a high voltage condition occurs on the lines coupled to the terminals 40 and 42. At the same time, the circuit protector 20 insures that the line terminals 40 and 42 are maintained coupled to the ground terminal 44 whenever the arrester 50 is not in position in the circuit protector 20 or whenever the arrester 50 is subjected to a prolonged overvoltage fault on the lines coupled to the terminals 40 and 42. Moreover, the circuit protector 20 and, particularly, the ground clip assembly 24, enables the use of the same protector base assembly 22 when a three-electrode gas tube arrester 50 is utilized or when a two-electrode carbon or gas tube arrester is utilized to protector the telephone lines.

More specifically, the base assembly 22 is substantially identical to the base of the circuit protector shown in FIGS. 1-10 of U.S. Pat. No. 3,310,712. The base 30 is made of a high dielectric material with the upstanding wall 32 projecting from the base 30 at the one end 34 between side edges 52 and 54. The notch 46 in the wall 32 is centrally located between the side edges 52 and 54 and is adapted to receive the grommet 48. The grommet 48 is made of insulating material such as rubber or the like and seals the notch 46 while providing access for wires connected to the terminals 40, 42 and 44.

As illustrated in conjunction with the line terminal 42, the telephone lines are coupled to the line terminals 40 and 42 by a nut assembly 56. A lower portion 57 of the line terminal 42 is embedded in the base portion 30 and is coupled to a tortous conductive contact member 58 (FIG. 4) which also is embedded in the base portion 30. The contact member 58 has a line contact 60 located at the base of a cavity 62 in the arrester mounting section 36. A similar line contact 64 is located in another cavity 65 in the arrester mounting section 36 and is coupled to the line terminal 40.

The ground terminal 44 is coupled to ground potential by a grounding line coupled to the ground terminal 44 by a nut assembly 66. The ground terminal 44 is coupled by a ground strap 68 to a ground plate 70 (FIG. 3) embedded in the arrester mounting section 36. A lip portion 72 of the ground plate 70 forms a lip about the top portion of the cavity 62 and another lip portion 74 of the ground plate 70 forms a lip about the top edge of the cavity 65.

Disposed along the top portion of the arrester mounting section 36 and in the cavities 62 and 65 is the ground clip assembly 24. The ground clip assembly 24 has an arrester holding assembly 76 having a ground electrode clip 78, a ground support 80 and a pair of opposed module retaning clips 82 and 84. The arrester holding assembly 76 overlies the top portion of the arrester mounting section 36 whereas a pair of movable contact assemblies generally indicated as 86 and 88, which form a part of the ground clip assembly 24, are insertable into the cavities 65 and 62, respectively. As illustrated in connection with the movable contact assembly 86, the movable contact assemblies 86 and 88 have a movable rod portion 90 slidably mounted in a shell assembly 92, which has an insulating gasket 94 with an hexagonal head driving portion 96 and a conducting shell portion 98 with a threaded portion 100. When the contact assembly 86 is inserted into the cavity 65, the turning of the head 96 enables the threaded portion 100 on the shell portion 98 to engage the lip portion 74 of the ground plate 70. In this manner, the shell portion 98 is maintained at ground potential.

With the contact assembly 86 so positioned in the cavity 65, a spring 102 attached to one end 104 of the rod portion 90 forces a basket structure 106 against the line contact 64. As long as there is no force applied to the other end 108 of the rod 90, the spring 102 forces the rod 90 away from the line contact 64 until a cup member 110 attached to the end 104 of the rod 90 and surrounding the basket member 106 engages the lower end 112 of the shell portion 98. This is specifically illustrated in FIG. 6 of the drawings. Since the cup member 110 is made of a conductive material, the rod portion 90 to which the cup member 110 is attached at the end 104 is maintained at ground potential. In addition, the line contact 64 is maintained at ground potential because the line contact 64 is coupled to the cup member 110 through the spring member 102 and/or the basket portion 106. With the line contact 64 maintained at ground potential, the line terminal 40 is also maintained at ground potential. In a similar manner, the line contact 60 is maintained at ground potential when the contact assembly 88 is so inserted into the cavity 62 such that the line terminal 42 is also maintained at ground potential. Thus, the contact assemblies 86 and 88 normally couple the line terminals 40 and 42 to ground terminal 44 whenever the ground clip assembly 24 is positioned in the arrester mounting section 36 and the module 26 is not disposed in the arrester holding assembly 76.

Figure 2:
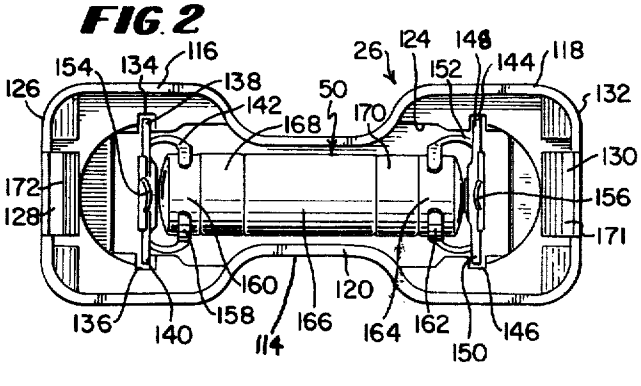
FIG. 2 is a bottom plan view of a plug-in module used in the station protector of FIG. 1.
Figure 3:
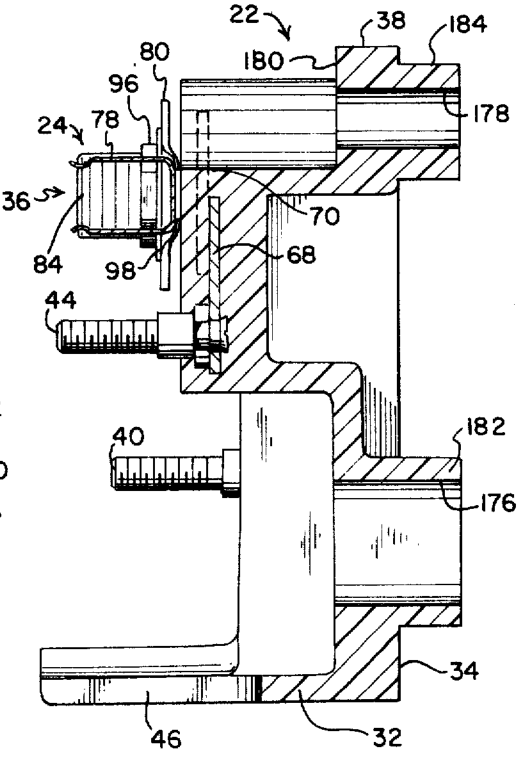
FIG. 3 is a cross-sectional view taken along line 3—3 of FIG. 1 with the cover and plug-in module removed.

In order to protect the telephone lines coupled to the line terminals 40 and 42 from overvoltages or high surge currents occurring on the telephone lines, the arrester 50 contained in the arrester module 26 must be properly mounted in the ground clip assembly 24. More specifically, the arrester module 26 is best seen in FIGS. 1 and 2 and has a nonconductive case 114 that is similar in shape to a dog bone having enlarged end portions 116 and 118 interconnected by a central holding portion 120. An upper portion 122 of the case 114 is generally enclosed and a lower portion 124 is generally open. Extending from the lower portion 124 through the upper portion 122 and along an edge 126 of the end portion 116 is a slot 128. Similarly, a slot 130 extends from the lower portion 124 along an edge 132 of the end portion 118.

As can be best seen in FIG. 2, the case 114 is generally hollow so that the arrester 50 can be properly positioned within the case 114. In order to do this, the end portion 116 has a pair of opposed slots 134 and 136 into which is slidably mounted projections 138 and 140 of a holding member 142. The end portion 118 has similar slot portions 144 and 146 into which projections 148 and 150 of a holding member 152 can be inserted. A shaft member 154 is fusibly linked to the holding member 142 and a shaft member 156 is fusibly linked to the holding member 152. The connection of the shafts 154 and 156 to the holding members 142 and 152, respectively, is normally made by a fusible material such as solder or the like. The fusible material is selected to melt when a specific amount of heat is generated by the conduction of current through the arrester 50 during prolonged overvoltage conditions occurring on the lines coupled to the terminals 40 and 42. By properly selecting this fusible material, the connection of the shaft 154 to the holding member 142 and the shaft 156 to the holding member 152 can be designed to be broken at a predetermined magnitude and length of time of an overvoltage condition.

The holding member 142 also has a gripping portion 158 that retains a line electrode 160 of the gas tube arrester 50 such that the line electrode 160 is coupled to the shaft 154 through the holding member 142 and the fusible material coupling the holding member 142 to the shaft 154. Similarly, the holding member 152 has a gripping portion 162 that retains another line electrode 164 of the gas tube arrester 50. When the gripping portion 162 is positioned about the line electrode 164, the line electrode 164 is coupled to the shaft member 156 by the holding member 142 and the fusible material connecting the shaft 156 to the holding member 152.

When the projections 138 and 140 are positioned in the slots 134 and 136, respectively, and the projections 148 and 150 are positioned in the slots 144 and 146, respectively, the gas tube arrester 50 is positioned within the case 114 such that a ground electrode 166 is located adjacent the central holding portion 120 of the case 114. The gas tube arrester 50 disclosed in the drawings is a relatively standard type three-electrode gas tube arrester having the line electrodes 160 and 164 at opposite ends of the gas tube arrester 50 with ceramic spacers 168 and 170 separating the line electrodes 160 and 164 from the ground electrode 166. The line electrodes 160 and 164 have portions extending into the gas tube arrester 50 adjacent the tube shaped ground electrode 166 so that spark gaps are formed between the line electrode 160 and the ground electrode 166 and the line electrode 164 and the ground electrode 166. However, it should be noted that other types of three-electrode gas tube arresters can equally as well be retained in the case 114.

Figure 6:
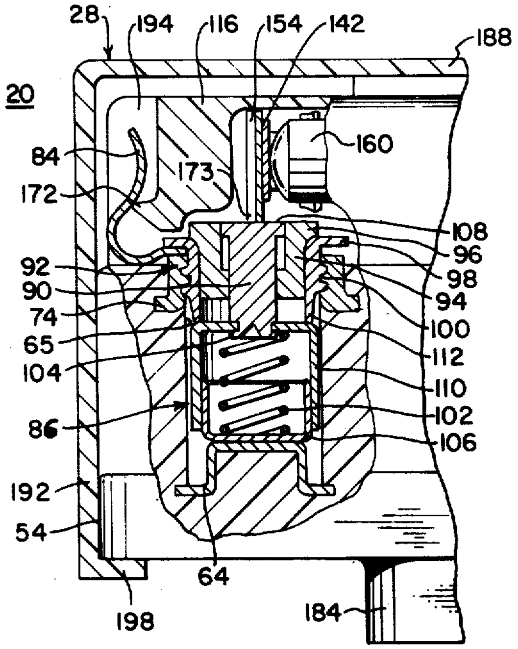
FIG. 6 is a partial cross-sectional view of the lefthand portion of FIG. 5 but with the contact assembly shorting the line electrodes of the gas tube arrester to ground.
Figure 5:
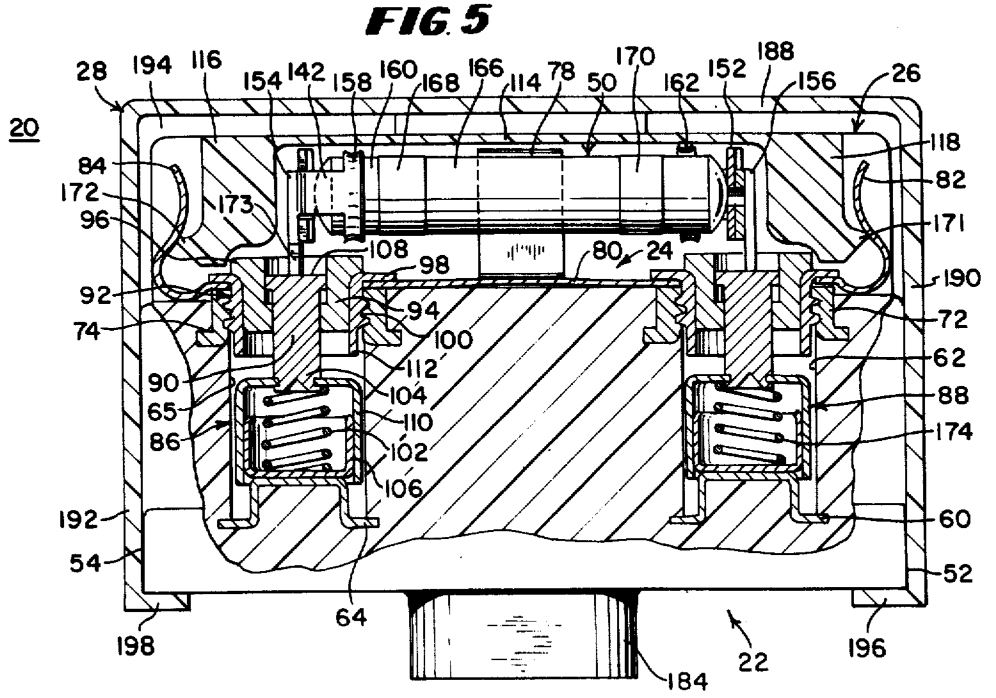
FIG. 5 is a cross-sectional view taken generally along line 5—5 of FIG. 1 but not showing a portion of the base assembly and the three-electrode gas tube arrester in cross-section.

In order to couple the line electrodes 160 and 164 to the line terminals 40 and 42, respectively, and the ground electrode 166 to the ground terminal 44 so as to enable the gas tube arrester 50 to protect the lines coupled to the line terminals 40 and 42 from high voltages or surge currents, the arrester module 26 must be properly positioned on the arrester holding assembly 76. This can be accomplished by gripping the case 114 of the arrester module 26 about the central portion 120 and forcing or plugging in the arrester module 26 into the arrester holding assembly 76 so that it is positioned as shown in FIG. 5. When the arrester module 26 is so positioned in the arrester holding assembly 76, the retaining clip 82 is positioned in the slot 130 and the retaining clip 84 is positioned in the slot 128. As can be seen in FIGS. 5 and 6, the retaining clip 82 then applies a retaining force on a lip portion 171 in the slot 130 and the retaining clip 84 applies an opposite retaining force on a lip portion 172 in the slot 128. Moreover, the ground clip 78 snaps about the ground electrode 166 such that the gas tube arrester 50 is coupled to the ground terminal 44 through the ground clip 78, the ground support member 80, the lip portions 72 and 74 of the ground plate 70 and the ground strap 68. In this manner, the arrester 50 is properly positioned relative to the contact assemblies 86 and 88.

More specifically, as the module 26 is positioned in the arrester holding assembly 76 and, particularly, between the retaining clips 82 and 84, a lower portion 173 of the shaft 154 applies a force against the top 108 of the rod 90. As the rod 90 is forced toward the line contact 64 in the cavity 65, the spring 102 is compressed and also the cup member 110 disengages the lower portion 112 of the shell portion 98 as it moves along with the rod 90 toward the line contact 64. Since the cup member 110 is no longer coupled to the shell portion 98, the line contact 64 and the rod 90 are no longer maintained at ground potential. As a result, when the contact assembly 86 is in the configuration shown in FIG. 5 with the arrester module 26 disposed in the arrester holding assembly 76, the line electrode 160 of the arrester 50 is coupled to the line terminal 40 through the retaining member 142, the fusibly linked shaft 154, the rod 90, either the cup member 110 or the spring 102, the basket 106 and the line contact 64. Similarly, the contact assembly 88 couples the shaft 156, which is coupled to the line electrode 164 of the gas tube arrester 50, to the line contact 60 and thereby to the line terminal 42.

As long as the line electrodes 164 and 160 are coupled to the line terminals 42 and 40, respectively, and the ground electrode 166 is coupled to the ground terminal 44, the lines coupled to the line terminals 40 and 42 are protected from overvoltages conditions or faults occurring on those lines. Thus, if an overvoltage condition occurs on either of the lines coupled to the line terminals 40 and 42, the spark gap between the line electrodes 160 and 164 and the ground electrode 166 in the gas tube arrester 50 will spark over such that the line terminals 40 and 42 are coupled to ground potential through the shorted spark gaps in the arrester 50 and the contact assemblies 86 and 88.

The pressure applied to the case 114 by the retaining clips 82 and 84 and the pressure applied to the ground electrode 166 by the ground clip 78 is sufficient to insure that the shaft 154 will maintain the spring 102 compressed as shown in FIG. 5 of the drawings and to insure that the shaft 156 will maintain a similar spring 174 in the contact assembly 88 compressed as also shown in FIG. 5. In the event that a sustained overvoltage potential is applied to the line electrodes 160 and 164 of the gas tube arrester 50 through the shaft 154 and holding member 142 and through the shaft 156 and the holding member 152, respectively, the circuit protector 20 enables the lines coupled to the line terminals 40 and 42 to be directly coupled to ground potential so as to be protected in the event of such an overvoltage condition.

More specifically and as illustrated in FIG. 6 of the drawings with respect to the contact assembly 86, the shaft 154, the holding member 142 and the line electrode 160, the fusible material interconnecting the shaft 154 to the holding member 142 will melt when such a predetermined overvoltage condition occurs on the line connected to the line terminal 40. When the fusible material does melt, the shaft 154 no longer applies any pressure to the top 108 of the rod 90 and the force applied by the compressed spring 102 to the end 104 of the rod 90 forces the rod 90 toward the hexagonal head 96 of the gasket 94. As the spring 102 expands, the rod 90 continues to move toward the case 114 until the cup member 110 again engages or abuts against the lower portion 112 of the shell 98. During this movement of the rod 90, the shaft 154 slids upward in the hollow portion of the case 114 as generally illustrated in FIG. 6.

When the cup 110 engages the shell portion 98, the cup member 110 is grounded because the shell portion 98 is coupled to the ground support 80, which in turn is coupled to the ground terminal 44. With the cup member 110 at ground potential, the rod 90, the spring 102 and the basket member 106 also are maintained at ground potential. In addition, the line contact 64 and, therefore, the line terminal 40 are grounded such that the line coupled to the line terminal 40 is maintained at ground potential and any equipment or the like coupled to that line will be protected even if the gas tube arrester 50 is not capable of protecting the line during a predetermined type of or subsequent overvoltage condition.

Similarly, the fusible material linking the shaft 156 to the holding member 152 will melt during such overvoltage conditions such that the shaft 156 will move away from the contact assembly 88 in the cavity 62. This is due to the expansion of the compressed spring 174 in the contact assembly 88. As the spring 174 does expand, the contact assembly 88 will ground the line contact 60 so that the line terminal 42 will also be maintained at ground potential. Thus, both the line terminals 40 and 42 will be maintained at ground potential whenever the fusible materials linking the shaft 154 to the holding member 142 and the shaft 156 to the retaining member 152 melt due to overvoltage conditions on the lines coupled to the line terminals 40 and 42. Moreover, this melting of the fusible material will insure that the lines coupled to the line terminals 40 and 42 will be protected from subsequent abnormal overvoltage faults even if the gas tube arrester 50 fails in an open condition during an overvoltage situation.

Advantageously, the gas tube arrester 50 is readily insertable into the case 114 and secured therein by the shaft 154 and holding member 142 and the shaft 156 and the retaining member 152. This can be accomplished while the case 114 is not inserted in the ground clip assembly 24 and while the gas tube arrester 50 is not coupled to any telephone lines. Once the gas tube arrester 50 is mounted within the case 114, personnel mounting the arrester module 26 in the ground clip assembly 24 are not required to come in contact with any metal parts during the installation of the gas tube 50 in the circuit protector 20. In addition, as long as the arrester module 26 is not mounted in the ground clip assembly 24, all of the metal parts of the ground clip assembly 24 are maintained at ground potential since the contact assemblies 86 and 88, as illustrated in connection with contact assembly 86 in FIG. 6, maintain the line contacts 64 and 60 at ground potential or coupled to the ground terminal 44.

As previously indicated, the ground clip assembly 24 is designed so that it can be installed or removed from previously designed bases of circuit protectors in which a two-electrode type gas tube or carbon arresters were previously used. This is accomplished by merely inserting the contact assemblies 86 and 88 into the cavities 65 and 62, respectively, and securing the contact assemblies 86 and 88 in those cavities 65 and 62 by rotating the head 96 of the shell assembly 92. Likewise, the gas tube arrester 50 can be readily replaced by merely removing the case 114 and inserting a new case 114 with a new gas tube arrester 50 inserted therein.

Moreover, the circuit protector 20 enables the base assembly 22 to be readily mounted to a mounting surface such as a wall at a station. This is accomplished by elongated apertures 176 and 178. As discussed in U.S. Pat. No. 3,310,712, the aperture 176 has its major axis generally parallel to the side edges 52 and 54 of the base 30. The aperture 178 is located in a ledge portion 180 between the arrester mounting section 36 and the end 38. The elongated axis of the aperture 178 generally is parallel to the plane of the upstanding wall 32. The apertures 176 and 178 extend through the base portion 30 of the base assembly 22 and through collars 182 and 184, respectively. The collars 182 and 184 abut against the mounting surface to which the circuit protector 20 is to be mounted.

The circuit protector 20 also provides for the protection of the lines coupled to the terminals 40 and 42 from foreign particles such as the weather, dirt and insects and prohibits unauthorized personnel from tampering with the circuit connections. More specifically, the circuit protector 20 includes the cover 28 which can be slid over the base assembly 22 from the end 38 to the upstanding wall 32. When the cover 28 is so positioned over the base assembly 22, an upper edge 186 of the upstanding wall 32 abuts against an upper wall 188 of the cover 28, the side walls 190 and 192 of the cover 28 abut against the side edges 52 and 54, respectively, of the base assembly 22, a rear wall 194 of the cover 28 abuts against the end portion 38 and lips or flanges 196 or 198 of the cover 28 abut against the lower surface of the base 30 so as to completely encompass the components located in the base assembly 22.

In order to insure that the cover 28 is not removed by unauthorized personnel, covert tamperingproof devices similar to that shown in U.S. Pat. No. 3,310,712 are utilized. In particular, a rounded projection similar to projection 200 is located on each of the side walls 190 and 192 of the cover 28 and fits within detent or curved notches such as notch 202 on the side edges 52 and 54. Once the projections 200 are within the notches 202, the cover 28 cannot be removed unless the side walls 190 and 192, which are slightly resilient and flexible, are moved away from the side edges 52 and 54 to disengage the projections 200 from the notches 202.

Thus, the circuit protector 20 not only embodies all of the advantageous features of the circuit protector disclosed in U.S. Pat. No. 3,310,712, but also enables various commercially available station protectors which utilize two-electrode type arresters to be refitted or converted to use a three-electrode gas tube type arrester. More specifically, there are various types of circuit protectors which utilize two electrode type of gas tube or carbon arresters. As previously indicated, U.S. Pat. No. 3,310,712 discloses one form of such a protector in which a carbon type of arrester is utilized in protecting the telephone lines connected to the protector. In addition, a two-electrode gas tube arrester can be used in that protector.

The circuit protector disclosed in FIGS. 1–10 of that patent utilizes substantially the same base as the station protector disclosed in the present application. The circuit protector disclosed in FIGS. 11–18 of the patent also utilizes a carbon type of arrester to protect the telephone lines which are coupled to the circuit protector. In addition, the protector in FIGS. 11–18 of that patent has fuses in series with the telephone lines.

Another type of station protector utilizing two-electrode type of arresters is disclosed in U.S. Pat. No. 3,345,542, which patent is also assigned to the assignee of record of the present application. The station protector in this latter patent has a slightly different base configuration than the base disclosed in the present application, but still provides protection for telephone lines by the utilization of two-electrode gas tube or carbon arresters.

In the event that such station protectors or other similar commercially available protectors are to be converted so as to use a three-electrode gas tube arrester rather than a two-electrode type of arrester, the ground clip assembly 24 of the present application is used in making the conversion. In order to convert a station protector using a base assembly such as the base assembly 22, any two-electrode types of arresters disposed in the cavities 62 and 65 are removed from the base assembly 22 so that the ground clip assembly 24 can be positioned in the arrester mounting section 36 together with the arrester module 26. Since the cover 28 can be completely removed from the base assembly 22, the conversion can be accomplished without disconnecting the lines coupled to the terminals 40, 42 and 44. Thus, the conversion of a circuit protector to one utilizing a three-electrode gas tube arrester 50 can be accomplished without disconnecting the protected telephone lines from the protector itself.

Figure 4:
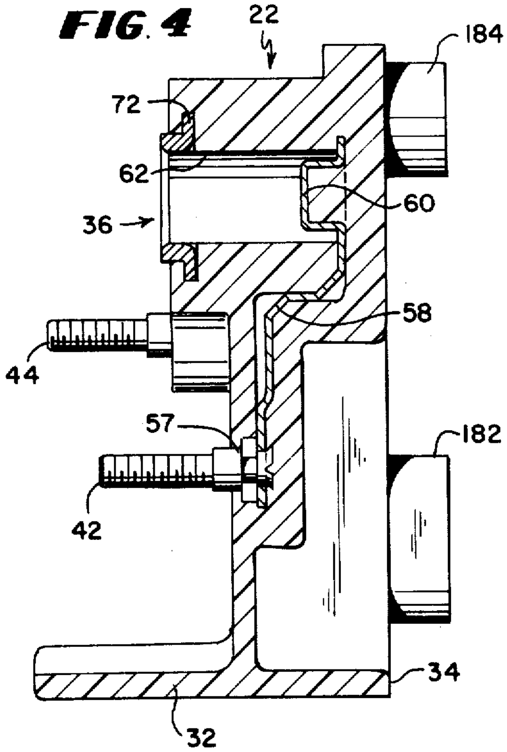
FIG. 4 is a cross-sectional view taken along line 4—4 of FIG. 1 with the cover, plug-in module and ground clip assembly removed.

Once the two-electrode type of arresters are removed from the base assembly 22, the cavities 62 and 65, as illustrated in connection wth the cavity 62 in FIG. 4 of the present application, will be essentially empty with the line contact 60 located at the base of the cavity and the lip portion 72 of the ground plate 70 extending about the upper portions of the cavity 62. The ground clip assembly 24 then can be mounted in the arrester mounting section 36 so that the ground clip assembly 24 will be positioned in the base assembly 22 as disclosed in FIGS. 1, 3, 5 and 6 of the present application.

More specifically, in order to mount the ground clip assembly 24 in the arrester mounting section 36 of the base assembly 22, the contact assembly 86 is inserted into the open cavity 65 and the contact assembly 88 is inserted into the open cavity 62. As the contact assembly 86 is inserted into the cavity 65, the basket 106 under the influence of the spring 102 makes contact with the line contact 64 at the base of the cavity 65. To secure the contact assembly 86 in the cavity 65, the hexagonal head portion 96 of the shell assembly 92 is rotated such that the threaded portion 100 of the shell portion 98 engages the lip 74 of the ground plate 70. Similarly, the contact assembly 88 is securedly mounted in the cavity 62 as specifically shown in FIG. 5.

It should be noted that as soon as the contact assemblies 86 and 88 are positioned within the cavities 65 and 62, respectively, the cup member 110 engages the lower portion 112 of the shell portion 98 such that the contact rod 90 as well as the line contact 64 are essentially coupled to the ground terminal 44 through the ground plate 70 and the ground strap 68. Moreover, since the shell portion 98 also makes contact with the ground support 80 of the arrester holding assembly 76, the entire arrester holding assembly 76 including the ground clip 78 and the opposed retaining clips 82 and 84 are coupled to the ground terminal 44. In this manner, all of the exposed metal portions of the circuit protector 20 are coupled to ground potential or the ground terminal 44 as soon as the ground clip assembly 24 is inserted into the arrester mounting section 36.

Once the ground clip assembly 24 is so positioned in the arrester mounting section 36, the arrester module 26, in which is disposed the three-electrode gas tube arrester 50, can be inserted into the arrester holding assembly 76. As heretofore explained, once the arrester module 26 is inserted into the arrester holding assembly 76, the ground clip 78 engages the ground electrode 166 and the retaining clips 82 and 84 engage the lip portions 171 and 172 located in the slots 130 and 128, respectively, of the case 114. In this manner, the arrester module 26 is removably retained within the ground clip assembly 24.

At the same time, the shaft 154 which is fusibly linked to the holding member 142 forces the rod 90 toward the line contact 64 such that the rod 90 and the line contact 64 are no longer coupled to the ground terminal 44 through the cup member 110. This is illustrated in FIG. 5 of the drawings. Similarly, the shaft 156, which is fusibly linked to the holding member 152, forces the spring 174 to be compressed such that the contact assembly 88 no longer couples the line contact 60 to the ground terminal 44. When the arrester module 26 is so positioned in the ground clip assembly 24, the gas tube arrester 50 protects the line coupled to the terminals 40 and 42 from any overvoltage condition that might arise on those lines. In addition, whenever any sustained overvoltage condition occurs on the lines coupled to the terminals 40 and 42, the fusible material connecting the shaft 154 to the holding member 142 and the fusible material connecting the shaft 156 to the holding member 152 melts so that the lines coupled to the terminals 40 and 42 are coupled to the ground terminal 44 as heretofore explained.

Therefore, the ground clip assembly 24 enables previously utilized circuit protectors to be readily converted to a protector utilizing a three-electrode gas tube arrester such as the arrester 50. Moreover, the circuit protector 20 enables gas tube arresters 50 to be readily mounted in the circuit protector 20 so that personnel are not subjected to metal parts which might not be at ground potential.

Although the present invention is described with reference to a single illustrative embodiment thereof, it should be understood that numerous other modifications and embodiments of the invention can be devised by those skilled in the art that will fall within the spirit and scope of the principles of this invention.

What is claimed and desired to be secured by Letters Patent of the United States is:

1. A circuit protector for protecting telephone lines by means of an arrester having a pair of line electrodes and a ground electrode, and protector comprising a substantially nonconductive base having line terminals to be coupled to said telephone lines, a ground terminal and an arrester mounting section, line contact means in said base coupled to said line terminals and extending into said arrester mounting section, grounding means in said base coupled to said ground terminal and extending into said arrester mounting section, a ground clip assembly disposed in said arrester mounting section, said ground clip assembly having arrester holding means coupled to said grounding means and contact assembly means which has movable contact means coupled to said line contact means and selectively movable to be coupled to said grounding means, and an arrester module having a case into which is insertable said arrester and having arrester contact means fusibly linked to said line electrodes, said case being retained in said arrester mounting section such that said ground electrode is coupled to said grounding means by said arrester holding means and said arrester contact means is coupled to and controls the movement of said movable contact means.

2. The circuit protector as set forth in claim 1 wherein said base has an upstanding wall at one end with an aperture therein and including insulating grommet means insertable into said aperture through which said lines can be extended to said line terminals and said ground terminal.

3. The circuit protector as set forth in claim 1 wherein said arrester mounting section has cavity means, said line contact means includes a line contact at the base of said cavity means and said grounding means includes a ground plate having lip portions extending into said cavity means.

4. A circuit protector as set forth in claim 1 wherein said arrester contact means includes first and second holding portions, said first holding portion being coupled to one of said line electrodes and said second holding portion being coupled to said other line electrode, first and second contact shaft portions, said first contact shaft portion being linked to said first holding portion by fusible material and being in contact with said movable contact means and said second contact shaft portion being linked to said second holding portion by fusible material and being in contact with said movable contact means.

5. The circuit protector as set forth in claim 4 wherein said fusible material melts in predetermined overvoltage occurrences such that said first and second contact shaft portions allow said movable contact means to move so as to be coupled to said grounding means.

6. The circuit protector as set forth in claim 1 wherein said arrester holding means includes a ground support means having a pair of opposed retaining clips and a ground clip means and being coupled to said grounding means, said retaining clips being positioned so as to removably retain said case therebetween and said ground clip means being connected to said ground electrode of said arrester when said case is positioned between said retaining clips.

7. The circuit protector as set forth in claim 1 wherein said contact assembly means includes spring means connected to said movable contact means, said spring means normally maintaining said movable contact means connected to said grounding means.

8. The circuit protector as set forth in claim 7 including first conductive means coupled to said spring means and said line contact means and second conductive means connected to said movable contact means and slidably engageable with said first conductive means, said second conductive means coupling said movable contact means to said grounding means.

9. The circuit protector as set forth in claim 1 including a cover to fit about said base so as to protect said terminals, said ground clip assembly and said arrester module.

10. In combination with the circuit protector having at least one line terminal and a ground terminal disposed on a base, a ground clip assembly comprising securing means to removably secure said group clip assembly on said base, a ground support means coupled to said ground terminal and having a ground clip and retaining clip means, and at least one contact assembly having resilient biased movable contact means, said movable contact means being coupled to said line terminal and being movable so as to be coupled also to said ground terminal.

11. The combination as set forth in claim 10 wherein said contact assembly further comprises a shell assembly having a conducting shell portion connecting said ground support means to said ground terminal and having an insulating shell portion in which said movable contact means is movably mounted, a spring means connected to said movable contact means, a first conductive means connected to said spring means and to said line terminal, and a second conductive means connected to said movable contact means and disposed at least partially about and in electrical contact with said first conductive means, said second conductive means being movable to selectively engage said conducting shell portion.

12. A circuit protector for protecting lines by means of a gas tube arrester having first and second line electrodes and a ground electrode, said circuit protector comprising a base having first and second line terminals and a ground terminal, first and second line contact means in said base, said first line contact means being coupled to said first line terminal and said second line contact means being coupled to said second line terminal, grounding means coupled to said ground terminal, a ground clip assembly disposed on said base, said ground clip assembly having a ground support means coupled to said grounding means and including retaining clip means and a ground clip, a first contact assembly having a first movable means, said first movable means being connected by said first contact assembly to said first line contact means and movable to be also connected to said grounding means, and a second contact assembly having a second movable means, said second movable means being connected by said second contact assembly to said second line contact means and movable to be also connected to said grounding means, an arrester module having a case in which is disposed said gas tube arrester, said case being removably insertable in said retaining clip means, first contact means coupled to said first line electrode, and second contact means coupled to said second line electrode, said first and second contact means being positioned such that when said case is inserted in said retaining clip means, said ground clip detachably connects to said ground electrode, said first contact means moves said first movable means so that said first movable means is not coupled to said grounding means and said second contact means moves said second movable means to that said second movable means is not coupled to said grounding means.

13. The circuit protector as set forth in claim 12 wherein the force applied to said case by said retaining clip means and the force applied to said ground electrode by said ground clip is sufficient to enable said first and second contact means to move said first and second movable means.

14. The circuit protector as set forth in claim 12 wherein said first contact assembly has a first shell portion coupled to said ground support means and said grounding means and a second insulating shell portion in which is slidably mounted said first movable means, and said second contact assembly has a third shell portion coupled to said ground support means and said grounding means and a fourth insulating shell portion in which is slidably mounted said second movable means.

15. The circuit protector as set forth in claim 14 including a first spring means normally maintaining said first movable means coupled to said first shell portion and a second spring means normally maintaining said second movable means coupled to said third shell portion.

16. The circuit protector as set forth in claim 12 wherein said base has first and second cavities, said first cavity having disposed therein a portion of said first line contact means and said first contact assembly and said second cavity having disposed therein a portion of said second line contact means and said second contact assembly.

17. The circuit protector as set forth in claim 16 wherein said first contact assembly has first securing means for detachably securing said first contact assembly in said first cavity and said second contact assembly has second securing means for detachably securing said second contact assembly in said second cavity.

18. The circuit protector as set forth in claim 12 including an upstanding wall on said base with an aperture therein through which said lines can be extended to be connected to said first and second line terminals and said ground terminal, a cover means removably positioned about said base to protect the base, the first and second line terminals, the ground terminal, the arrester module and the ground clip assembly from foreign matter, and sealing means sealing said aperture.

19. The circuit protector as set forth in claim 12 including fusible material coupling said first contact means to said first line electrode and said second contact means to said second electrode, said fusible material being designed to melt when a specific condition occurs on said lines.

20. A clip assembly for mounting a three-electrode arrester having a pair of line electrodes and a ground electrode disposed in a case, said clip assembly comprising holding means for retaining said case, grasping means for coupling to said ground electrode when said case is retained in said holding means, and a first contact means having a first resiliently biased movable contact means movable between a first position coupled to said grasping means and a second position not coupled to said grasping means, said first movable contact means being coupled to one of said line electrodes when said case is positioned within said holding means.

21. The clip assembly as set forth in claim 20 including a second contact means having a second resiliently biased movable contact means movable between a first position coupled to said grasping means and a second position not coupled to said grasping means, said second movable contact means being coupled to the other of said line electrodes when said case is positioned within said holding means.

22. The clip assembly as set forth in claim 21 including first shaft means coupling said first movable contact means to said one line electrode and controlling the movement of said first movable contact means, said first shaft means including fusible material enabling said first shaft means to move said first movable contact means to said first position, and second shaft means coupling said second movable contact means to said other line electrode and controlling the movement of said second movable contact means, said second shaft means including fusible material enabling said second shaft means to move said first movable contact means to said first position.

23. A circuit protector for protecting telephone lines by means of an arrester having line electrode means and a ground electrode, said protector comprising a base having line means and a ground means, arrester holding means coupled to said ground means, contact assembly means having movable contact means coupled to said line means and selectively movable to be coupled to said ground means, and an arrester module having a case in which is disposed said arrester and having arrester contact means fusibly linked to said line electrode means, said case being disposed on said base such that said arrester holding means couples said ground electrode to said ground means and said arrester contact means is coupled to and controls the movement of said movable contact means.

24. The circuit protector as set forth in claim 23 wherein said arrester contact means is fusibly linked to said line electrode means by a fusible material that is in thermal relationship to said line electrode means such that said fusible material melts in response to a predetermined condition on said telephone lines and said arrester contact means allows said movable contact means to be coupled to said ground means.

25. A circuit protector comprising base means having line terminal means and a grounding means, an arrester grasping means coupled to grounding means, contact means having movable contact means coupled to said line terminal means and selectively movable to be coupled to said grounding means, and an arrester module having a three-electrode gas tube arrester with a pair of line electrodes and a ground electrode, said arrester module having control means fusibly coupled to said line electrodes and a case in which said arrester is disposed, said case being removably retained on said base means such that said ground electrode is positioned in said arrester grasping means and said control means is coupled to and controls the movement of said movable contact means.

26. The circuit protector as set forth in claim 25 wherein said movable contact means includes first and second movable conductive means and said control means includes first and second shaft means, said first shaft means is fusibly linked by a first fusible material to one of said line electrodes such that when such first fusible material melts, said first shaft means allows said first movable conductive means to move into contact with said grounding means and said second shaft means is fusibly linked by a second fusible material to said other of said line electrodes such that when said second fusible material melts, said second shaft means allows said second movable conductive means to move into contact with said grounding means.

* * * * *